3,134,724
MALTING PROCESS
Lawrence D. Beckord, Elm Grove, and John G. Fleckenstein, Brookfield, Wis., assignors to Kurth Malting Company, Milwaukee, Wis., a corporation of Wisconsin
No Drawing. Filed Aug. 28, 1961, Ser. No. 134,133
7 Claims. (Cl. 195—71)

This invention relates to malting. More particularly, this invention is concerned with a novel process of producing malt with increased yields.

The losses associated with the malting process can be divided into two groups: uncontrollable losses and controllable losses. The uncontrollable losses are those over which the maltster has no control. One of these losses is due to steeping or soaking of the kernels in water prior to the germination step, with the resulting extraction of soluble materials from the grain and their subsequent removal when the water is drained from the steeped grain. The steeping losses normally amount to about 1%. There is another loss of weight over which the maltster has no control. The grain as received at the malting plant varies in moisture from 10 to 14%. The malt is sold at a moisture level of from 3.5 to 6%. The differences in moisture content of the grain as received and the malt as shipped is a direct loss in weight which is not controllable in the malting process.

The controllable weight losses occur during the germination process. As the grain begins to grow it respires and liberates carbon dioxide. This loss of carbon dioxide is termed respiration loss and amounts to from 5–8% of the weight of the barley put into process. In addition, as the seed grows it puts out rootlets which are removed in the kilning and cleaning processes of malting and are lost. The rootlet loss amounts to from 3–5% of the weight of the barley put into process.

The efficiency of the malting process is evaluated normally by reference to the number of bushels of malt obtained per bushels of grain that are malted; thus, with reference to barley, 1 bushel of barley usually will yield a maximum of about 1.18 to 1.20 bushels of malt in a well controlled conventional malting operation. If the malting operation could be made completely efficient, a yield of about 1.31 to 1.32 bushels of malt would be obtained per bushel of barley. Although more bushels of malt are obtained than bushels of barley started with, it must be noted that 1 bushel of barley weighs 48 pounds and 1 bushel of malt weighs 34 pounds.

Any reduction achieved in the controllable losses during the malting process results in an increase in the amount of malt prepared from a definite amount of barley. Clearly, the economic position of the maltster who is able to reduce respiration or rootlet losses is directly improved.

We have found that ammonia, applied to grain such as barley during the germination period (viz., after steep out and before kilning), selectively inhibits the formation of rootlets without appreciably affecting the respiration of the germinating grain. As a result, treatment of barley with ammonia during germination increases the malt yields substantially and up to 5% and higher. The ammonia treatment appears to repress the formation of rootlets and retain the tissue that would normally form the rootlet in the malted kernel.

As used herein, "ammonia" is intended to include gaseous ammonia in pure form or diluted with a gas such as air, or in the form of aqueous solutions, such as ammonium hydroxide.

Although the invention is applicable to small grains in general including rye, oats and wheat, it is especially applicable to barley.

The rootlet inhibition is not due to a pH effect brought about by the addition of ammonia. This is shown by the addition of alkaline salts such as sodium bicarbonate and carbonate. Solutions of these alkaline salts were added to the germinating grain in amounts sufficient to increase the pH of the resulting malt above that of malts prepared by the addition of ammonia as described herein. Table A shows the effects of the addition of ammonia and the above-mentioned compounds on the pertinent yield data, along with pH.

TABLE A

| Compound added | Yield, wt. percent of untreated control | | Wort pH* |
|---|---|---|---|
| | Rootlets | Malt | |
| Ammonia | 28.0 | 103.7 | 6.14 |
| Sodium bicarbonate | 75.3 | 101.4 | 6.22 |
| Sodium carbonate | 75.3 | 100.9 | 6.24 |
| Control malt | | | 6.01 |

*Analyses reported herein according to "Methods of Analysis of the American Society of Brewing Chemists," 6th edition, American Society of Brewing Chemists, Madison, Wisconsin, 1958.

The malt treated with ammonia has a lower pH than the malts treated with the alkaline salts and yet had a considerably reduced amount of rootlet. Comparison of yield figures between the alkaline salt treated malts and the ammonia treated malt shows that the difference in yield between the malts is due to the reduction in rootlet formation in the ammonia treated malt.

The germinating barely can be treated with the ammonia intermittently or continuously throughout the germinating period. Best results are obtained, however, when the barley is treated with ammonia during the entire germination period from steep out through to just prior to kilning.

The barely is advisably subjected to treatment with ammonia by blending gaseous ammonia into the air stream used to aerate the germinating barley kernels. However, the air stream can be percolated through aqueous ammonia to sweep with it a predetermined and suitably effective amount of ammonia. Another alternative is to sprinkle or spray aqueous ammonium hydroxide directly onto the germinating mass of barley kernels or to convert aqueous ammonium hydroxide into a fine mist which can be carried along dispersed in the ventilating air.

It is surprising to find that the rootlet growth can be reduced substantially by treatment with very small amounts of ammonia. Indications are that a total application of not more than 1.5% of ammonia, or its equivalent as ammonium hydroxide, to the germinating grain, based on the weight of grain, especially barely, need be employed to obtain the benefits of this invention with production of a malt of good quality for brewing. However, nearly maximum benefits can be achieved using total lower amounts of ammonia, such as from 0.75% to 1.1% of amonia per weight of germinating grain. Although what might be considered trace amounts of ammonia no doubt have a beneficial effect, for practical reasons enough ammonia should be used to treat the germinating grain to measurably reduce rootlet formation. A minimum total amount of about 0.05%, and advisably 0.10%, of ammonia based on the weight of the germinating grain is generally to be used.

Application of the ammonia to the germinating grain appears to give the best yields of malt when the ammonia is added at a constant rate and uniform concentration. This is not essential, however, since one or more periodic treatments of the germinating grain preferably during each day of germination leads to good results.

Intermittent ammonia addition or delaying the addition for a period after steep out, or cutting off the addition prior to the end of the germination period give fewer benefits than when the ammonia addition is carried out throughout the germination period.

Nevertheless, excessive application of ammonia at any one time is to be avoided to avoid adverse results and waste of ammonia above that contemporaneously assimilable by the grain.

In addition to reducing rootlet growth the ammonia treatment gives malts containing higher total nitrogen content than malts produced without the ammonia addition under identical conditions. Depending upon the amount of ammonia added the total nitrogen content of the malt can be raised up to about 0.5%. The ammonia treatment for beneficial results is usually selected to increase the total nitrogen content of the malt from about 0.04 to about 0.24%, it being understood that as the nitrogen content increases, the amount of rootlet formation decreases in this process.

The ammonia treatment also results in an increase in berry size over untreated malts and may result in an increase in alpha-amylase content.

The invention will now be illustrated by the following examples.

*Example 1*

A series of normal and ammonia treated malts were prepared by steeping 400 gram samples of kindred barley for 30 hours with appropriate water changes. The moisture levels were adjusted by the addition of the required amounts of water to bring all samples to identical moisture levels.

The samples were germinated at 63 to 65° F. for five days under identical conditions of agitation with 200 ml. per minute of humidified air passing through the samples. Ammonia was added to the ventilating air stream of those malts selected to be treated with ammonia at the rate of 0.5 gram of ammonia per day per sample throughout the germinating period to give a total addition of 2.5 grams of ammonia per sample. The green malts were kilned to 180° F. and the recoveries of malt and rootlets determined. The untreated malt consisted of 12 samples and the ammonia treated malts numbered eleven samples. The recoveries obtained are listed below.

| Treatment | Total wt. from kiln, grams | Rootlets and clean-out, grams | Clean malt, grams |
|---|---|---|---|
| Control | 357.9 | 11.4 | 346.5 |
| Ammonia treated | 364.0 | 3.5 | 360.5 |

Analytical data as determined by the methods of The American Society of Brewing Chemists for the control and ammonia treated malts is given below.

| | Control | Ammonia treated |
|---|---|---|
| Growth of acrospire: | | |
| 0–¼ | 1 | 3 |
| ¼–½ | 1 | 1 |
| ½–¾ | 10 | 5 |
| ¾–1 | 88 | 91 |
| Over 1 | 0 | 0 |
| Assortment: | | |
| On 7/64 mesh screen | 10.1 | 23.9 |
| On 6/64 mesh screen | 70.1 | 64.7 |
| On 5/64 mesh screen | 19.6 | 11.1 |
| Thru 5/64 mesh screen | 0.2 | 0.3 |
| Moisture (percent) | 3.8 | 4.3 |
| Extract, dry (percent) | 74.4 | 73.5 |
| Diastase (° L.) | 124 | 151 |
| Alpha-amylase (20° units) | 35.7 | 48.9 |
| Total nitrogen (percent) | 2.07 | 2.41 |
| Soluble nitrogen (percent) | 0.702 | 0.837 |
| S/T | 33.0 | 34.7 |
| Wort viscosity, cps | 1.46 | 1.48 |
| Wort pH | 6.09 | 6.22 |

*Example 2*

A set of malts was prepared with 350 g. samples of kindred barley in which the amount of ventilating air and therefore the amount of ammonia added to the germinating barley was varied. The control sample had no ammonia in the air stream, the treated samples were ventilated with 200, 300, and 400 ml. per minute of air containing the equivalent of 0.5 g., 0.75 g., and 1.0 g. of ammonia per day. Recovery and other data concerning these malts are listed below.

| | Weight of ammonia per sample per day | | | |
|---|---|---|---|---|
| | 0 | 0.5 g. | 0.75 g. | 1.0 g. |
| Wt. from kiln (g.) | 315.3 | 318.8 | 319.8 | 322.5 |
| Rootlets (g.) | 10.6 | 1.8 | 1.3 | 1.0 |
| Clean malt (g.) | 304.7 | 317.0 | 318.5 | 321.5 |
| Increase (percent) | 22.9 | 27.9 | 28.5 | 29.7 |
| Alpha-amylase | 48.3 | 54.1 | 44.1 | 33.5 |
| Modification Index* | 27 | 27 | 24 | 10 |

*The Modification Index is a measure of the conversion of the barley or other grain, to malt. The higher the value, the greater is the conversion into malt. Malts have modification index values of about 25 to 50 while barley has a value less than 2. The modification index provides similar information as the wort viscosity and coarse-fine difference determinations.

$$\text{Modification Index} = 100 \times \frac{1}{\text{TCA viscosity}}$$

TCA viscosity is determined as follows:

A 25 gm. sample of malt is finely ground (Miag Cone Mill, setting 95). A flask is heated to approximately 68° C., 25 mls. of 40% trichloroacetic acid added and then 200 mls. of hot tap water. The mixture is cooled to 68° C., the 25 gm. of malt added and the mixture blended 2 minutes and filtered.

A viscosimeter is cooled to 20° C. and a 10 ml. sample of the malt dispersion is added. After cooling to 20° C. the running time is recorded. This is then repeated.

The water time of the viscosimeter is measured by adding 10 ml. of distilled water to a clean, drained viscosimeter and the running time measured at 20° C.

The viscosity is then calculated as follows:

$$\text{TCA viscosity} = \frac{\text{Running time of malt solution}}{\text{Running time of water}}$$

*Example 3*

A set of malts, with 350 g. samples of kindred barley, was prepared and the treatment consisted of the addition of suitable dilutions of aqueous ammonium hydroxide daily throughout the germination period. Treatments were adjusted to give the equivalent of the addition of 0.24, 0.12, and 0.06 grams of gaseous ammonia daily. Data of the control malt and the treated malts follows.

| | Weight of ammonia per sample per day | | | |
|---|---|---|---|---|
| | 0 | 0.06 g. | 0.12 g. | 0.24 g. |
| Wt. from kiln (g.) | 315.8 | 316.2 | 317.0 | 321.0 |
| Rootlets (g.) | 10.0 | 7.0 | 4.0 | 1.8 |
| Percent treated/control | | 70 | 40 | 18 |
| Clean malt (g.) | 305.8 | 309.2 | 313.0 | 319.2 |
| Percent treated/control | | 101.1 | 102.4 | 104.4 |
| Increase (percent) | 23.3 | 24.7 | 26.2 | 28.8 |
| Alpha-amylase | 45.1 | 43.7 | 42.7 | 30.0 |
| Modification Index | 28 | 31 | 30 | 22 |

*Example 4*

Gaseous ammonia was added to the ventilating air stream of a germinating sample of barley at such a rate as to produce an increase in the total nitrogen content of the finished malt of 0.12% above that of a control treated in an identical fashion, except no gaseous ammonia was introduced into the ventilating air stream of the control sample. The weight of rootlets removed from the treated sample amounted to 70% of the weight of rootlets removed from the control sample. The weight of malt recovered from the treated sample amounted to 101.9% of that of the untreated sample.

*Example 5*

Diluted ammonium hydroxide was added to samples of germinating barley throughout the germinating period in such amounts and at such periods as to give an increase in total nitrogen content of the finished malts of 0.16% over that of a control treated identically, except that no ammonium hydroxide was added. The weight of rootlets removed from the treated sample amounted to 30.6% of the weight of rootlets removed from the control sample. The weight of malt recovered from the treated sample amounted to 103.3% of that of the untreated control.

*Example 6*

Diluted ammonium hydroxide was added to a sample of germinating barley as in Example 5 as to give an increase in the total nitrogen content of the finished malt of 0.25% over that of a control malt treated identically, except that no ammonium hydroxide was added. The weight of the rootlets removed from the treated malt amounted to 28% of the weight of the rootlets removed from the control malt. The weight of malt recovered from the treated sample amounted to 104.1% of that of the untreated malt.

*Example 7*

Gaseous ammonia was added to the ventilating air stream of a germinating sample of barley at such a rate as to produce an increase in the total nitrogen content of the finished malt of 0.22% above that of the control treated in an identical fashion, except no gaseous ammonia was introduced into the ventilating air stream of the control malt. The weight of rootlets removed from the treated samples amounted to 53.3% of the weight of rootlets removed from the control sample. The weight of malt recovered from the treated sample amounted to 102.2% of that of the weight of the untreated sample.

Analysis of the finished malts gave the following:

|  | Control sample | Treated sample |
|---|---|---|
| Assortment: |  |  |
| On 7/64 mesh screen | 23.2 | 42.2 |
| On 6/64 mesh screen | 52.5 | 47.6 |
| On 5/64 mesh screen | 13.8 | 9.5 |
| Thru 5/64 mesh screen | 0.5 | 0.7 |
| Diastase, ° L | 129 | 129 |
| Alpha-amylase, 20° units | 37.7 | 38.5 |
| Total nitrogen, percent | 1.98 | 2.20 |
| Soluble nitrogen, percent | 0.776 | 0.800 |

*Example 8*

Gaseous ammonia was added to the ventilating air stream of a germinating sample of barley, previously steeped in a conventional commercial manner, starting at the period of two days after the germination process had commenced. The ammonia was added at such a rate as to produce an increase in the total nitrogen content of the finished malt of 0.13% above that of a control treated in an identical fashion, except no gaseous ammonia was introduced into the ventilating air stream of the control malt. The weight of rootlets removed from the treated samples amounted to 66.3% of the weight of rootlets removed from the control sample. The weight of malt recovered from the treated sample amounted to 102.4% of that of the weight of the untreated sample.

Analytical data follows:

|  | Control sample | Ammonia treated sample |
|---|---|---|
| Assortment: |  |  |
| On 7/64 mesh screen | 21.6 | 32.5 |
| On 6/64 mesh screen | 59.5 | 50.4 |
| On 5/64 mesh screen | 18.0 | 16.2 |
| Thru 5/64 mesh screen | 0.9 | 0.9 |
| Diastase, ° L | 137 | 135 |
| Alpha-amylase, 20° units | 37.9 | 38.0 |
| Total nitrogen, percent | 1.88 | 2.01 |
| Soluble nitrogen, percent | 0.642 | 0.703 |
| Wort pH | 6.04 | 6.09 |

*Example 9*

Gaseous ammonia was added to the ventilating air stream of a germinating sample of rye at such a rate as to produce an increase in the total nitrogen content of the finished malt of 0.24% above that of a control sample treated in an identical fashion except no gaseous ammonia was introduced into the ventilating air stream of the control sample. The weight of rootlets removed from the treated sample amounted to 69% of the weight of rootlets removed from the control malt. The weight of malt recovered from the treated sample amounted to 101.8% of that of the untreated sample.

*Example 10*

Samples of wheat and oats, 350 g. of dry grain, were given appropriate steeps, and germinated for five days at 63 to 65° F. with aeration. The ventilating air stream of each sample contained the equivalent of 0.5 g. of gaseous ammonia per day. Therefore each sample was exposed to a total of 2.5 g. of gaseous ammonia during the five day germination period. After kilning the rootlets were removed and weighed and the yield of cleaned malt was determined and compared with the rootlet weight and clean malt weight of a control sample treated in an identical fashion except no ammonia was present in the ventilating air stream.

|  | Percent rootlets treated/control | Percent clean malt terated/control |
|---|---|---|
| Oats | 73.5 | 101.7 |
| Wheat | 65.5 | 101.9 |

The foregoing detailed description has been given for clearness of understanding only, and no unnecessary limitations should be understood therefrom, as modifications will be obvious to those skilled in the art.

What is claimed is:

1. The process of increasing malt recovered by selectively repressing rootlet growth which comprises treating germinating grain, in the period from steep out to kilning, with a small but effective amount of ammonia during the germination period.

2. The process of claim 1 in which the grain is barley.

3. The process of increasing the recovery of malt which comprises applying to the germinating grain in the period from steep out to kilning a small but effective amount, but not more than about 1.5 %, of ammonia based on the total weight of ammonia-treated germinating grain.

4. The process of increasing the recovery of malt which comprises applying to germinating barley in the period from steep out to kilning a small but effective amount, but not more than about 1.5%, of ammonia based on the total weight of ammonia-treated germinating barley, said ammonia application being spread out over at least a substantial part of the germination period.

5. The process of claim 3 in which at least about 0.05% of ammonia, based on the total weight of ammonia-treated germinating barley, is used.

6. The process of increasing the recovery of malt which comprises applying to germinating barley in the period from steep out to kilning a small amount of ammonia in the range of about 0.05% to about 1.5% by weight of the total weight of the germinating barley with said added ammonia being sufficient to increase the total nitrogen content of the malt by at least about 0.04%, and not more than 0.5%, above the total nitrogen content of an identically produced malt untreated with ammonia.

7. The process of increasing the recovery of malt which comprises aerating germinating barley with air containing a small amount of ammonia until the total amount of ammonia added is from about 0.25% to about 1.5% by weight of the total weight of the germinating barley.

References Cited in the file of this patent

UNITED STATES PATENTS

| | | |
|---|---|---|
| 179,700 | D'Heureuse | July 11, 1876 |
| 2,901,401 | Grimm et al. | Aug. 25, 1959 |
| 2,991,231 | Lucht et al. | July 4, 1961 |

FOREIGN PATENTS

| | | |
|---|---|---|
| 4,573 | Great Britain | Nov. 25, 1876 |

UNITED STATES PATENT OFFICE
CERTIFICATE OF CORRECTION

Patent No. 3,134,724                             May 26, 1964

Lawrence D. Beckord et al.

It is hereby certified that error appears in the above numbered patent requiring correction and that the said Letters Patent should read as corrected below.

Column 2, lines 30, 36 and 53, for "barely", each occurrence, read -- barley --; same column 2, line 58, for "amonia" read -- ammonia --; column 6, in the second table, heading to the second column, for "terated" read -- treated --; line 55, for "recovered" read -- recovery --.

Signed and sealed this 29th day of September 1964.

(SEAL)
Attest:

ERNEST W. SWIDER                            EDWARD J. BRENNER
Attesting Officer                                  Commissioner of Patents